United States Patent Office 3,839,506
Patented Oct. 1, 1974

3,839,506
HINDERED PHENOL PENTAERYTHRITOL PHOSPHONATE
Ingenuin Hechenbleikner, West Cornwall, and William P. Enlow, Falls Village, Conn., assignors to Borg-Warner Corporation, Chicago, Ill.
No Drawing. Filed Apr. 16, 1973, Ser. No. 351,782
Int. Cl. B01j 1/18; C07d 105/04
U.S. Cl. 260—927 R        12 Claims

ABSTRACT OF THE DISCLOSURE

Hindered phenol compounds are prepared having the formula:

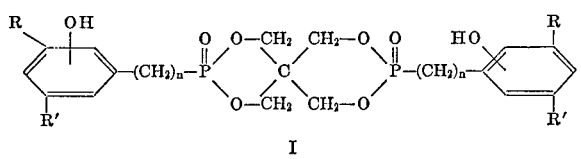

I where $n$ is an integer of 1 to 4, R is alkyl, hydrogen, cycloalkyl or aralkyl and R' is alkyl, cycloalkyl or aralkyl. The compounds are useful as antioxidants.

---

The present invention relates to novel hindered phenolic hydroxyl group containing phosphonates.

The phosphonates of the present invention have the formula:

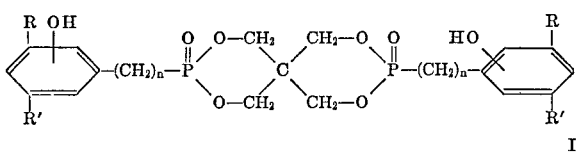

I where $n$ is an integer of 1 to 4, R is alkyl, hydrogen, cycloalkyl or aralkyl and R' is alkyl, cycloalkyl or aralkyl. Thus R and R' for example, can be alkyl of 1 to 20 or even 30 carbon atoms, e.g., methyl, ethyl, propyl, isopropyl, butyl, isobutyl, sec. butyl, t-butyl, t-amyl, amyl hexyl, heptyl, octyl, 2-ethylhexyl, isooctyl, t-octyl, decyl, dodecyl, octadecyl, eicosanyl, tetracosyl, or triacontyl, cycloalkyl of 5 to 12 carbon atoms or more, e.g. cyclopentyl cyclohexyl, methyl cyclohexyl, cyclooctyl, cyclodecyl or cyclododecyl, or aralkyl of 7 to 36 carbon atoms or more, e.g. benzyl, 4-methylbenzyl, phenethyl, 6-phenylhexyl, 12-phenyldodecyl, 12-alpha-naphthyldodecyl, 24-phenyltetracosyl, 30-phenyltriacontyl.

Preferably R and R' are both alkyl, more preferably at least one of R and R' is tertiary alkyl and most preferably both R and R' are tertiary alkyl.

Examples of compounds within the present invention are 3,9-di (3,5-di-t-butyl-4 - hydroxybenzyl) - 3,9 - dioxo-2,4,8,10,3,9-tetraoxadiphospha-spiro (5,5) hendecane; 3,9-di-(2(3,5-dimethyl-4-hydroxyphenyl) - ethyl) - 3,9 - oxo-2,4,8,10,3,9, - tetraoxadiphospha - spiro(5,5) hendecane; 3,9-di(2-hydroxy-3-t-butyl-5-methyl benzyl) - 3,9 - dioxa-2,4,8,10,3,9 - tetraoxadiphospha spiro (5,5) hendecane. Other examples of compounds within the present invention are set forth in Table 1 below. The compounds in Table 1 have the formula:

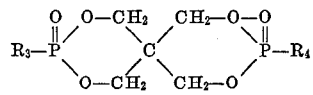

TABLE 1

| Cpd. | R₃ | R₄ |
|---|---|---|
| 1 | 3-t-butyl-4-hydroxybenzyl | 4-hydroxybenzyl. |
| 2 | 3,5-di-t-octyl-4-hydroxybenzyl | 3,5-di-t-octyl-4-hydroxybenzyl. |
| 3 | 3,5-di-n-octyl-4-hydroxybenzyl | 3,5-di-n-octyl-4-hydroxybenzyl. |
| 4 | 3,5-di-t-butyl-4-hydroxybenzyl | 3,5-di-t-amyl-4-hydroxybenzyl. |
| 5 | 3,5-di-dodecyl-4-hydroxybenzyl | 3,5-di-dodecyl-4-hydroxybenzyl. |
| 6 | 3-eicosanyl-4-hydroxybenzyl | 3-eicosanyl-4-hydroxybenzyl. |
| 7 | 3-triacontyl-4-hydroxybenzyl | 3-triacontyl-4-hydroxybenzyl. |
| 8 | 3,5-dicyclohexyl-4-hydroxybenzyl | 3,5-dicyclohexyl-4-hydroxybenzyl. |
| 9 | 3-cyclohexyl-5-ethyl-4-hydroxybenzyl | 3-cyclohexyl-5-ethyl-4-hydroxybenzyl. |
| 10 | 3,5-dicyclopentyl-4-hydroxybenzyl | 3,5-dicyclopentyl-4-hydroxybenzyl. |
| 11 | 3-methylcyclohexyl-4-hydroxybenzyl | 3-methylcyclohexyl-4-hydroxybenzyl. |
| 12 | 3-cyclododecyl-4-hydroxybenzyl | 3-cyclododecyl-4-hydroxybenzyl. |
| 13 | 3,5-dibenzyl-4-hydroxybenzyl | 3,5-dibenzyl-4-hydroxybenzyl. |
| 14 | 3-benzyl-5-t-butyl-4-hydroxybenzyl | 3-benzyl-5-t-butyl-4-hydroxybenzyl. |
| 15 | 3,5-di-t-butyl-2-hydroxybenzyl | 3,5-di-5-butyl-2-hydroxybenzyl. |
| 16 | 3,5-dihexyl-2-hydroxybenzyl | 3,5-dihexyl-2-hydroxybenzyl. |
| 17 | 3,5-dicyclohexyl-2-hydroxybenzyl | 3,5-dicyclohexyl-2-hydroxybenzyl. |
| 18 | 4-(3-methyl-5-cyclohexyl-4-hydroxyphenyl)-butyl | 4-(3-methyl-5-cyclohexyl-4-hydroxyphenyl)-butyl. |
| 19 | 4-(3,5-di-t-butyl-4-hydroxyphenyl)-butyl | 4-(3,5-di-t-butyl-4-hydroxyphenyl)-butyl. |
| 20 | 3-(3,5-di-t-octyl-4-hydroxyphenyl)-propyl | 3-(3,5-di-t-octyl-4-hydroxyphenyl)-propyl. |
| 21 | 2-(3,5-di-t-butyl-4-hydroxyphenyl)-ethyl | 2-(3,5-di-t-butyl-4-hydroxyphenyl)-ethyl. |
| 22 | 3,5-diethyl-4-hydroxybenzyl | 3,5-diethyl-4-hydroxybenzyl. |
| 23 | 2-hydroxy-3-t-butyl-5-methyl-benzyl | |

The compounds of the present invention can be prepared by any of the following reactions:

(1)

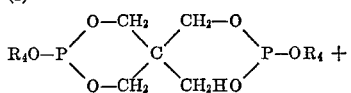

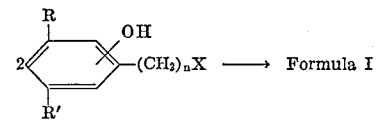  → Formula I where X is a halogen, preferably of atomic weight 35 to 80, i.e. chlorine, bromine or iodine.

(2)

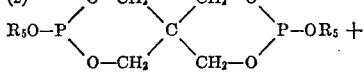

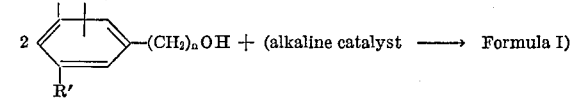 + (alkaline catalyst ⟶ Formula I)

(3)

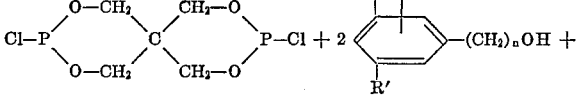

2 N-(C₂H₅)₃ or other tertiary amine ⟶ Formula I

In formula (2) R₅ can be aryl such as phenyl or cresyl or alkyl such as methyl, butyl, ethyl, isopropyl, hexyl or octyl, for example. Any conventional alkaline catalyst can be used, for example, sodium hydroxide, potassium hydroxide, sodium methylate, sodium phenolate, sodium hexylate, potassium methylate.

Typical examples of starting materials for reaction (2) are diphenyl pentaerythritol diphosphite, dimethyl pentaerythritol diphosphite, diethyl pentaerythritol diphosphite, dibutyl pentaerythritol disphosphite, diisooctyl pentaerythritol disphosphite.

In procedure (1) $R_4$ can be any of the alkyl groups mentioned for $R_5$. However, $R_4$ cannot be an aryl group. Thus in reaction (1) there can be used dimethyl pentaerythritol diphosphite, diethyl pentaerythritol diphosphite, dibutyl pentaerythritol diphosphite, dibutyl pentaerythritol diphosphite, diisopropyl pentaerythritol diphosphite, dioctyl pentaerythritol diphosphite.

In procedure (3) the tertiary amine can be tripropyl amine, tributyl amine, diethylmethyl amine, etc. In reaction 3 when $n$ is 1, the phosphonate is the only product. In reaction 3 when $n$ is 2, 3 or 4, any phosphite formed can be rearranged to the phosphonate by adding a small amount of sodium iodide or potassium iodide, e.g. 1 to 10 mol percent of the dichloropentaerythritol diphosphite.

As hindered phenols to be used as starting materials to make the final hindered phenol phosphonates there can be used, for example, 3,5-di-t-butyl-4-hydroxybenzyl chloride, 3,5-di-t-butyl-4-hydroxybenzyl alcohol, 3,5-di-t-butyl-4-hydroxybenzyl bromide, 3,5-di-t-butyl-4-hydroxybenzyl iodide, 3,5-dimethyl-4-hydroxybenzyl chloride, 3,5-dimethyl-4-hydroxybenzyl alcohol, 4-(3-methyl-5 - cyclohexyl-4-hydroxyphenyl)-butyl chloride, 4-(3-methyl-5-cyclohexyl-4-hydroxyphenyl)-butyl alcohol, 3-(2-hydroxy-4-t-butylphenyl) propyl chloride, 3-(2-hydroxy-4 - t - butylphenyl) propyl alcohol, 3,5-di-t-octyl - 4 - hydroxybenzyl bromide, 3-t-butyl-4-hydroxybenzyl chloride, 3-t-butyl-4-hydroxybenzyl alcohol, 3,5-di-n - octyl - 4 - hydroxybenzyl chloride (and the corresponding alcohol), 3,5-di-t-amyl-4-hydroxy-benzyl alcohol (and the corresponding chloride), 3,5-di-dodecyl-4-hydroxybenzyl chloride (and the corresponding alcohol), 3-eicosanyl-4-hydroxybenzyl alcohol (and the corresponding chloride), 3-triacontyl-4-hydroxy-benzyl chloride (and the corresponding alcohol), 3,5-dicyclohexyl-4-hydroxybenzyl chloride (and the corresponding alcohol), 3-cyclohexyl-5 - ethyl - 4 - hydroxybenzyl alcohol (and the corresponding chloride), 3,5-dicyclopentyl-4-hydroxybenzyl chloride (and the corresponding alcohol), 3-methylcyclohexyl-4 - hydroxybenzyl alcohol, 3,5-dibenzyl-4-hydroxybenzyl chloride (and the corresponding alcohol), 3-benzyl-5-t - butyl - 4 - hydroxybenzyl alcohol (and the corresponding chloride), 2-hydroxy-3-t-butyl-5-methylbenzyl chloride (and the corresponding alcohol), 2-hydroxy-3,5-di-t-butyl-benzyl alcohol (and the corresponding chloride), 2-hydroxy-3,5-dihexylbenzyl chloride (and the corresponding alcohol), 3,5-di-t-butyl-4-hydroxyphenyl) - butyl alcohol (and the corresponding chloride), 2-(3,5-di - t - butyl - 4 - hydroxyphenyl)-ethyl alcohol (and the corresponding chloride).

If mixed products are desired such as that of compound 1 of Table 1, there can be used a mixture of starting phenols.

The hindered phenol phosphonate compounds of the present invention are useful as phenolic antioxidants. Thus they can be used to stabilize organic materials normally subject to oxidative deterioration.

The phenolic phosphonate antioxidant is used in an amount of 0.005 to 10 parts per 100 parts of the polymer or other material to be stabilized, preferably 0.1 to 5 parts per 100 parts of polymer. Thus they are useful with many different kinds of solid polymers. For example, they can be used with resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g. vinyl chloride, are vinyl esters of carboxylic acids, e.g. vinyl acetate, vinyl propionate, vinyl butyrate and vinyl benzoate, esters of unsaturated acids, e.g. alkyl and alkenyl acrylates such as methyl acrylate, ethyl acrylate, propyl acrylate, butyl acrylate and allyl acrylate as well as the corresponding methacrylates, e.g. methyl methacrylate and butyl methacrylate, vinyl aromatic compounds, e.g. styrene p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α, β-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50% of the copolymer is made from a halogen containing vinylidene compound such as vinyl chloride, are among the preferred materials treated according to the invention.

The antioxidants or stabilizers of the present invention are also effective when intimately mixed with halogen containing resins in which part or all of the halogen is introduced into a preformed resin, e.g. chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio) vinyl chloride-trichloroethylene (95:5 weight ratio).

The resin, e.g. polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g. 10 to 100 parts for each 100 parts of the vinyl chloride containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminium salts of phenols, aromatic carboxylic acids, fatty acids and epoxy fatty acids.

Examples of suitable salts include barium di(nonylphenolate), strontium di(nonylphenolate), strontium di (amylphenolate), barium di(octylphenolate), strontium di(octylphenolate), barium di(nonyl-o-cresolate), lead di (octylphenolate), cadmium-2-ethylhexoate, cadmium laurate, cadmium stearate, zinc caprylate, cadmium caproate, barium stearate, barium-2-ethylhexoate, barium laurate, barium ricinoleate, lead stearate, aluminum stearate, magnesium stearate, calcium octoate, calcium, stearate (cadmium naphthenate, cadmium benzoate, cadmium p-tert. butylbenzoate, barium octyl salicylate, cadmium epoxy stearate, strontium epoxy stearate, cadmium salt of epoxidized acids of soybean oil, and lead epoxy stearate.

In plastisol formulations there can also be included from 0.1 to 10 parts per 100 parts of resin of an epoxy vegetable oil such as epoxidized soybean oil or epoxidized tall oil.

The antioxidants of the present invention are particularly effective with solid unsaturated hydrocarbon polymers such as polyethylene, polypropylene, ethylene propylene copolymers (e.g. 50:50, 80:20 and 20:80), ethylene-monoolefin copolymers wherein the monoolefin has 4–10 carbon atoms and is present in a minor amount, e.g. ethylene-butene-1 copolymer (95:5) and ethylenedecene-1 copolymer (90:10) polybutene. Furthermore, they can be used to stabilize natural rubber, styrene-butadiene rubber (SBR rubber), e.g. (75% butadiene-25% styrene), EPDM rubbers, ABS terpolymers (e.g. 20–30% acrylonitrile, 20–30% butadiene, 40–60% styrene), polyisoprene, polybutadiene, styrene-acrylonitrile copolymers butyl rubber, polyacrylonitrile and acrylonitrile copolymers (e.g. acrylonitrile-vinyl chloride 85:15), polystyrene, impact modified polystyrene, butadiene-acrylonitrile (e.g. 60:40); polymerized acrylates and methacrylates, e.g. polymethyl acrylate polymethyl methacrylates and polybutyl acrylate, polyacetals, e.g. polyoxymethylene polymers (e.g. Delrin and Celcon), polycarbonates (e.g. bisphenol A-carbonate polymer), polysulfones, polyphenyleneoxides, phenoxy resins, epoxy resins, A-epichlorhydrin, nylon, cellulose acetate, cellulose acetate-propionate, cellulose acetate-butyrate, cellulose nitrate, polyethylene oxide, ethyl cellulose, linear polyesters, e.g. polyethylene terephthalate (Dacron, Mylar), unsaturated polyester, e.g. vinyl compounds modified alkyds such as ethylene glycol phthalate-maleate modified with styrene or diallyl phthalate, oil modified alkyd resins, e.g. soybean oil-glyceryl phthalate resin, chlorosulfonated polyethylene, polyurethanes (e.g. toluene diisocyanate reaction products with polypropylene glycol molecular weight 2025 or with glycerine-ethylene oxide adduct having a hydroxyl number of 56).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent) propylene and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims, the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclodecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene, Enjay terpolymers, e.g. ERP–404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in United States Pats. 2,933,480; 3,000,866; 3,063,973; 3,093,620; 3,093,621 and 3,136,739, in British Patent 880,904 and in Belgian Patent 623,698.

There can also be incorporated in the hydrocarbon polymers, e.g. polypropylene conventional additives such as phosphites in an amount of 0.1 to 10 parts per 100 parts of polymer. Typical of such phosphites are triphenyl phosphite, tris decyl phosphite, decyl diphenyl phosphite, di(p-t-butylphenyl) phenyl phosphite, di-phenyl-o-cresyl phosphite, trioctyl phosphite, tricresyl phosphite, tribenzyl phosphite, polymeric phosphites such as Weston 243-B (made in accordance with Patent 3,341,629) and prepared from triphenyl phosphite and hydrogenated bisphenol and having a molecular weight of about 3000 and Weston 440 (a linear polymeric pentaerythritol hydrogenated bisphenol A phosphite made in accordance with Pat. 3,053,878, Weston WX 618-(distearyl pentaerythritol disphosphite), thiophosphites such as trilauryl trithiophosphite and tristearyl trithiophosphite.

There can also be included thio compounds in an amount of 0.01 to 10%, usually 0.1 to 5% of the polymer. Thus, there can be used pentaerythritol tetra (mercaptoacetate), 1,1,1 - trimethylolethane tri(mercaptoacetate), 1,1,1 - trimethylolpropane tri(mercaptoacetate), dioleyl thiodipropionate, dilauryl thiodipropionate, other thio compounds include distearyl 3,3'-thiodipropionate, dicyclohexyl - 3,3' - thiodipropionate, dicetyl-3,3'-thiodipropionate, dioctyl -3,3'-thiodipropionate, dibenzyl-3,3'-thiodipropionate, lauryl myristyl-3,3'-thiodipropionate, diphenyl - 3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methyl-mercapto propionic acid, lauryl ester of 3-butyl-mercapto propionic acid, lauryl ester of 3-laurylmercapto propionic acid, phenyl ester of 3-octylmercapto propionic acid, lauryl ester of 3-phenylmercapto propionic acid, lauryl ester of 3-benzyl-mercapto propionic acid, lauryl ester of 3-(p-methoxy phenylmercapto propionic acid, lauryl ester of 3-cyclohexylmercapto propionic acid, lauryl ester of 3-hydroxy-methylmercaptopropionic acid, myristyl ester of 3-hydroxy-ethylmercapto propionic acid, octyl ester of 3-methoxy-methylmercapto priopionic acid, dilauryl ester of 3-carboxy-methylmercapto propionic acid, dilauryl ester of 3-carboxy-propylmercapto propionic acid, dilauryl-4,7-dithiasebacate, dilauryl - 4,7,8,11 - tetrathiotetradecandioate, dimyristyl-4,11 - dithiatetradecandioate, lauryl - 3-benzothiazylmercaptopropionate. Preferably the esterifying alcohol is an alkanol having 10 to 18 carbon atoms. Other esters of beta thiocarboxylic acids set forth in Gribbins Patent 2,519,744 can also be used.

Likewise, there can be included 0.01–10%, usually 0.1–5% of a metal salt stabilizer in the monoolefin polymer formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added conventional phenolic antioxidants in an amount of 0.01–10%, preferably 0.1–5%. Examples of such phenols include 2,6-di-t-butyl-p-cresol (Ionol), butylated hydroxyanisole, propyl gallate, 4,4'-thiobis(6 - t - butyl-m-cresol), 4,4'-cyclohexylidene diphenol, 2,5-di-t-amyl hydroquinone, 4,4'-butylidene bis-(6-t-butyl-m-cresol), hydroquinone monobenzyl ether, 2,2' - methylene - bis(4-methyl-6-t-butylphenol) (Catalin 14), 2,6 - butyl - 4 - decyloxy-phenol, 2-t-butyl-4-dodecyloxyphenol, 2-t-butyl-4-octadecyloxyphenyl, 4,4'-methylene-bis(2,6-di-t-butyl phenol), p-aminophenol, N-lauryloxy - p - aminophenol, 4,4' - thiobis(3-methyl-6-t-butylphenol), bis[o-(1,1,3,3-tetramethylbutyl)phenol] sulfide, 4-acetyl-β-resorcylic acid, A stage p-t-butylphenolformaldehyde resin, crotonaldehyde condensate of 3-methyl-6-t-butyl-phenol, 2,6-di-t-butyl p-cresol (Toponol CA), 2,2-methylene bis 4-ethyl-6-t-butylphenol (AO–425), 4-dodecycloxy-2-hydroxy - benzophenone, 3 - hydroxy - 4-(phenylcarbonyl)phenyl palmitate, n-dodecyl ester of 3-hydroxy-4 - (phenylcarbonyl) phenoxy - acetic acid, t-butylphenol, octadecyl - 13,5 - di-t-butyl hydroxyphenyl) propionate (Irganox 1076).

Epoxy compounds in an amount of 0.01–5% in the hydrocarbon polymer compositions can also be included. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resins (epichlorhydrin-diphenylolpropane resins), phenoxy-propylene oxide, butoxy propylene oxide, epoxidized neopentylene oleate, glycidyl epoxystearate, epoxidized α- olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidol ether of 1,5-dihydroxynaphthalene, epoxidized linseed oil fatty acids, allyl glycidyl ether, butyl glycidyl ether, cyclohexane oxide, 4-(2,3 - epoxypropoxy) acetophenone, mesityl oxide epoxide, 2-ethyl-3-propyl glycidamide, glycidyl ethers of glycerine, pentaerythritol and sorbitol, and 3,4-epoxy-cyclohexane-1,1-dimethanol bis-9,10-epoxystearate.

The phenolic phosphonates of the invention can also be used to stabilize lubricating oils, e.g. aliphatic esters such as di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, paraffin, waxes, resins and the like, fatty acids such as soaps and the like. The stabilizer in such cases can also be used in an amount of 0.005 to 10% of the material to be stabilized.

Unless otherwise indicated all parts and percentages are by weight.

Example 1

3,9-Di(3,5-di-t-butyl-4-hydroxybenzyl - 3,9 - dioxo-2,4,8,10,3,9-tetraoxadiphospha-spiro(5,5)hendecane.

One mol (256 g.) of 3,9-dimethoxy-2,4,8,10-tetraoxa-3,9-diphospha-spiro(5,5)hendecane was dissolved in 1 liter of toluene and 2 mols (509 g.) of 3,5-di-t-butyl-4-hydroxybenzyl chloride in 500 ml. heptane were added. The mixture was heated slowly to 100–110° C. and methyl chloride was allowed to distill off. After 3 hours at 100° C. methyl chloride evolution had ceased and a heavy precipitate had separated. The mixture was cooled and filtered. The filter cake was washed with toluene to give 600 g. (90%) of the title compounds as a colorless, crystalline, high-melting solid.

Example 2

One mol (166 g.) of 2(3,5-dimethyl-4-hydroxyphenyl) ethyl alcohol was mixed with 128 g. (0.5 mol) of 3,9-dimethoxy-2,4,8,10,3,9 - tetraoxadiphospha-spiro(5,5)hendecane. Five grams of sodium methylate was added and the mixture was heated slowly to 150° C. Methanol started to distill off at 100° C. and in 2 hours 0.95 mol of methanol was recovered. Five grams of sodium iodide was then added and the mixture was heated for 10 hours at 150° C. At the end of this period a test with iodine showed the absence of trivalent phosphorus. The product was a colorless solid which was recrystallized from toluene. Infrared spectrum and phosphorus analysis were in agreement with the compound: 3,9-di-2(3,5-dimethyl-4-hydroxyphenyl)ethyl-3,9-oxo - 2,4,8,10,3,9 - tetraoxadiphospha-spiro(5,5) hendecane.

Example 3

3,9-Di(2-hydroxy-3-t-butyl - 5 - methylbenzyl)-3,9-dioxo-2,4,8,10,3,9-tetraoxadiphospha-spiro(5,5)hendecane.

One mol (256 g.) of 3,9-dichloro-2,4,8,10,3,9-tetraoxadiphospha-spiro(5,5)hendecane dissolved in 1 liter of toluene was added to 384 g. (2 mols) of 2-hydroxy-3-t-butyl-5-methylbenzyl alcohol dissolved in 500 ml. of toluene. Two hundred grams (2.05 mols) of triethylamine were added to the benzyl alcohol solution. The chloride solution was added to the amine-alcohol solution with cooling. When the addition was complete, the mixture was heated to 80° C. and filtered hot from the amine hydrochloride. Upon cooling, 520 g. (92%) of a colorless, crystalline solid was recovered. A phosphorus analysis and infrared spectrum confirmed the compound to be consistent with the title compound.

Example 4

Unstabilized polypropylene powder (Hercules Profax 6501) was thoroughly blended with 0.5% of the compound of Example 1 to produce a stabilized polypropylene. Blending can be accomplished in any suitable manner. e.g. in a Banbury mixer.

Stability can be tested in any conventional manner, e.g. using the *oven* aging test and the Fadeometer test described in Spivack Patent 3,714,300, col. 5, lines 23–48.

Example 5

100 parts of unstabilized polypropylene powder (Hercules Powder 6501) was thoroughly blended with 0.2 parts of the compound prepared in Example 2 and 0.5 part of dilaurylthiodipropionate to obtain a stabilized polypropylene.

The phenolic phosphonate compounds of the present invention also act as flame and fire retardants for solid hydrocarbon polymers such as polyethylene, polypropylene, polyisoprene, butadiene-styrene copolymer, EPDM polymers, ethylene-propylene copolymer, etc.

What is claimed is:

1. A compound having the formula:

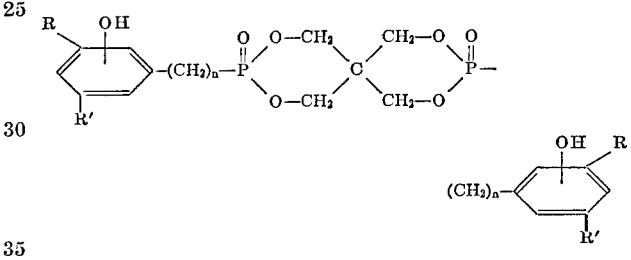

where R is hydrogen, alkyl of 1 to 30 carbon atoms, cycloalkyl of 5 to 12 carbon atoms or aralkyl of 7 to 36 carbon atoms, R' is alkyl of 1 to 30 carbon atoms, cycloalkyl of 5 to 12 carbon atoms or aralkyl of 7 to 36 carbon atoms and $n$ is an integer of 1 to 4.

2. A compound according to claim 1 wherein the OH groups are in the 2 or 4 position and in the 2' or 4' position.
3. A compound according to claim 1 wherein R is other than hydrogen.
4. A compound according to claim 3 wherein R and R' are both alkyl of 1 to 20 carbon atoms.
5. A compound according to claim 4 wherein the OH groups are in the 2 and 2' positions.
6. A compound according to claim 4 wherein the OH groups are in the 4 and 4' positions.
7. A compound according to claim 4 wherein R is t-butyl.
8. A compound according to claim 7 wherein R' is t-butyl.
9. A compound according to claim 7 wherein R' is alkyl of 1 to 20 carbon atoms.
10. A compound according to claim 9 wherein $n$ is 1.
11. A compound according to claim 4 wherein $n$ is 1.
12. A compound according to claim 2 wherein $n$ is 1.

References Cited

UNITED STATES PATENTS 3,493,637    2/1970    Coupland _____ 260—927 R

ANTON H. SUTTO, Primary Examiner

U.S. Cl. X.R.

44—76, Dig. 4; 252—49.8, 400 A; 260—45.8 R, 45.8 A, 398.5, 814